Feb. 14, 1967  M. M. SCHUSTER  3,304,109

JOINT INCLUDING TAPERED FASTENER

Filed April 21, 1965

INVENTOR.
MICHAEL M. SCHUSTER
BY
ATTORNEYS.

United States Patent Office 3,304,109
Patented Feb. 14, 1967

3,304,109
JOINT INCLUDING TAPERED FASTENER
Michael M. Schuster, Inglewood, Calif., assignor to Hi-Shear Corporation, Torrance, Calif., a corporation of California
Filed Apr. 21, 1965, Ser. No. 449,748
4 Claims. (Cl. 287—189.36)

This invention relates to a tapered fastener, and to a joint which includes said fastener.

Tapered fasteners are widely used in aircraft construction, especially where fluid-sealing along the fastener is desired or where improved fatigue life is desired in shear joints. For these purposes, an interference fit is used wherein the pin is oversize relative to the hole, and material bounding the hole is displaced when the pin is forced into the hole. Ideally, there should result an intimate and continuous peripheral contact between the pin and the wall of the hole. As a practical matter, conventional tapered fasteners have given less than optimum results, and even these results have been attained only by use of very complex technology.

For example, when the material into which the hole is formed swells as the pin is pulled into the hole, the material must flow somewhere, because it is essentially incompressible. The normal and expected place for it to flow is toward the top of the hole—the larger end into which the fastener is forced. The swell of material at that end may, in conventional fasteners, prevent the head from seating against the body. Then, for practical purposes, the advantages of the head are sacrificed. It is an object of this invention to provide means whereby the material may swell within the hole, and the head may seat without impediment.

Still another disadvantage of the present tapered fastener art resides in the difficulty of manufacturing and inspecting the same. It is customary to call out major and minor taper diameters at datum points related to some surface of the head. Both of these datum points are located on a tapered surface. Therefore, in both manufacturing and inspecting operations, the datum points must first be located, and then the diameters can be measured. In the instant invention, both diameters may be unrelated to tapered surfaces, and both may be measured without a first measurement for locating a datum point.

Still another disadvantage of the prior art resides in the fillet radius at the junction where the shank and the head of the fastener meet. These radii are necessary in a practical fastener, but require special countersinking or formation of the hole at its larger end in installations using conventional fasteners. This invention permits a tapered hole to be used which does not have or need countersinking, chamfering, or the like, at either end of the hole to accommodate fillets.

Yet another serious disadvantage of conventional tapered fasteners resides in the inherent relationship between their grip lengths and their head sizes. It is axiomatic that edge distance from holes in plates is proportional to hole and head size. If the head size increases, then edge distance must also increase. When edge distance increases, the weight also increases, and this, in airborne and space installations, is something to be avoided.

In the use of tapered fasteners, the nominal size of the fastener relative to a hole is usually specified, along with a grip length and grip range. Generally speaking, an attempt is made to give the smaller end of the hole a diameter reasonably close to the nominal size of the fastener. Then the size of the diameter at the larger end depends on the angle of taper and the length of the hole (the grip). Obviously, the diameter at the larger end increases as the hole length increases.

In an attempt to bring some measure of order into this situation which includes several interdependent variables, it has been common practice to define groups of grip lengths, and then relate the diameters of the larger and smaller ends to the groups. Between groups, an attempt is made to keep nearly constant the smaller diameter, while the larger one varies. This in turn raises the problem of head size. As the shank size increases next to the head, so also does the head diameter have to increase. Therefore, numerous head sizes are provided, at least one for each group, and as the head sizes increase, so does the requirement for edge distance.

In addition, the taper angle is frequently adjusted from grip range to grip range to keep down the head size, but this raises the problem of matching the fastener and the hole. The result of this is that there are now provided special drills for holes for each nominal size in each group. Even with this accommodation, the individual drill will often make a hole intended for several taper angles, and this compromise results in a less-than-optimum fit. It is an object of this invention to enable a wider range of lengths to be used with a head of a given size, and with a constant taper angle over a broader range of grip lengths, thereby overcoming many of the problems which have plagued the prior art.

A joint according to this invention comprises a plurality of overlapping plates and a headed bolt. The plates include a continuous conical tapered hole extending therethrough with the bolt being disposed therein and with the bolt being seated against the outermost plate. The hole has a central axis and reference lateral dimensions. The bolt has an axis and includes a shank having a conical tapered portion and a second portion lying closer to the axis than would a continuation of the tapered portion, the second portion being adjacent to the head and spacing the conical tapered portion therefrom. The lateral dimensions of the conical tapered portion initially were, when out of the hole, greater than the referenced lateral dimensions of the hole at the axial locations which will be axially contiguous thereto when the bolt is seated with its head against the outermost plate. Therefore, in the joint the bolt forms with the plates an interference fit in which the axially-aligned lateral dimensions of the hole and of the tapered portion of the bolt are equal. At least a part of the second portion of the bolt is spaced throughout its periphery from the sidewall of said hole to form a void adjacent to the head and within the hole. There is a wave formed, this wave projecting into the void, and there are engagement means on the end of the shank opposite from the head.

According to a preferred but optional feature of the invention, the engagement means is a thread.

According to still another preferred but optional feature of the invention, the relieved portion is a right circular cylinder coaxial with the said axis.

Figure 1:
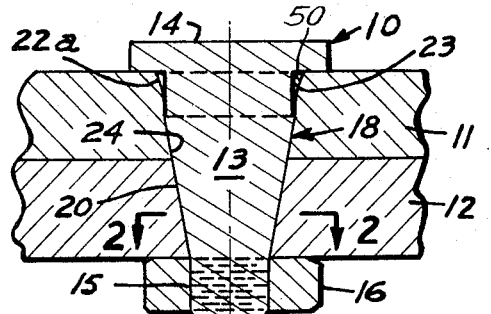
FIG. 1 is an axial cross-section of the invention installed in a shear joint.
Figure 2:
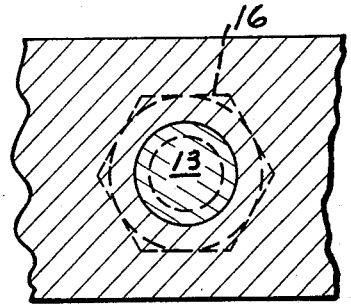
FIG. 2 is a cross-section taken at line 2—2 of FIG. 1.

The presently preferred embodiment of a tapered fastener 10 according to the invention is shown in FIG. 1. It is shown installed so as to join a pair of plates 11, 12 so that they are clamped tightly together, held against shear movement, and are so intimately fitted to the fastener that an intimate and continuous fit is made between the fastener and the wall of the hole.

The fastener includes a shank 13, an integral head 14 at one end, and engagement means 14a at the other end. The engagement means preferably comprises a thread 15 to which a nut 16 may be attached.

The fastener has a central axis 17. It also includes a peripheral surface 18 on the shank which has two portions. A first of said portions is a conical tapered portion 19 that is generated by a straight-line generator 20, which generator is moved around the axis to generate the surface. This straight-line generator lies in a plane which includes a central axis and lies at an angle thereto so as to form a taper in the order of 0.020" per inch of axis length. For purposes of illustration, the taper is shown much greater in the figures.

The tapered portion is adjacent to the engagement means. The second of said portions is a relieved portion 22. It is contiguous to the head and to the tapered portion, and lies between them. This portion is substantially cylindrical and is thus relieved from the surface which would be occupied by the tapered portion were it to be extended past the junction between them. The relieved portion 22 lies entirely within this theoretical surface, and preferably is, as shown, a right circular cylinder, although it may have other shapes instead. Preferably it is generated by a straight-line generator 22a which, instead of the cylindrical form shown, might be a cone slanting toward or away from the axis at some angle at it extends away from the tapered portion. The characteristic of the relieved portion is that its surface leaves a void 23 between a tapered hole 24 in the plates and the peripheral surface of the shank at the relieved portion when the fastener is installed in a hole. Because the "second portion" 22 lies within the theoretical surface, at least a part of it will be spaced throughout its periphery from the sidewall of the hole when the head is seated against the outermost plate.

Figure 3:
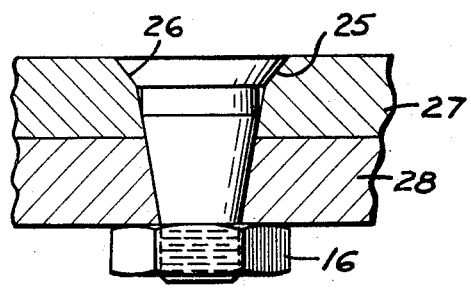
FIG. 3 is a side elevation, partly in cutaway cross-section, of an alternate embodiment of the invention.

The fastener is shown in FIG. 1 with a flat protruding head. In FIG. 3, the same fastener is shown, but with a countersink head 25 in a countersunk hole 26 in plate 27 that overlays plate 28. With the exception of the head configurations, the fasteners of FIGS. 1 and 3 are identical. In FIG. 1, the wall of the hole is shown including a swell or wave 50 which projects into void 23. The relative size of the wave is exaggerated for purposes of illustration. Because of the nature of the drawings, no wave has been shown in FIGS. 3 or 6, but one would be formed in these figures as well. The wave is formed by displacement of material when the head of the bolt is seated against the outermost plate.

Figure 4:
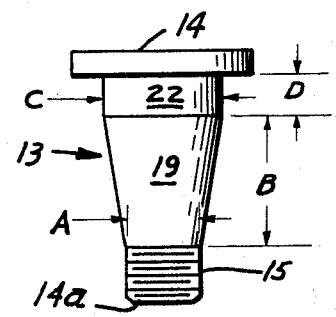
FIG. 4 is a side elevation of the fastener of FIG. 1.

As an example of suitable dimensions, the following are given in connection with a tapered fastener according to FIG. 1, shown in FIG. 4, having a nominal thread diameter of ½".

A _____ .500
B _____ 1.000
C _____ .520
D _____ .050

The use of the fastener of all of the figures may readily be understood by reference to the drawings. It will be evident from these drawings that the fastener which is placed in an undersized hole will be forced into the hole by tightening down on the nut. As the fastener is drawn into the hole, there will be developed a wave of material which tends to appear at the upper surface thereof. Frequently, this will interfere with the seating of the head on the top of plates 11 or 27 when conventional tapered bolts are used. However, in the instant invention, void 23 permits the wave to form on the wall of the hole adjacent to the relieved portion. This is below the upper surface, and the head can therefore properly seat upon the top plate. This is a great improvement when attempting to make a fatigue-resistant joint.

Furthermore, in manufacturing and inspecting this bolt, it will be noted that dimensions C and A may readily be determined by micrometer readings at a cylindrical region and a discrete point. Dimension C is a cylindrical surface and does not require that an axial location for inspection be determined before actually measuring the diameter. The constructions shown enables the major and minor diameters of the shank to be quickly manufactured and inspected.

In the joint formed by the overlapping plates and the bolt, with the bolt head seated against the outermost plate (plate 11 in FIG. 1 and plate 27 in FIG. 3), the axially aligned lateral dimensions of the tapered portion 20 and of the sidewall of the hole will be identical. Because this is an interference fit, before the joint was formed the lateral dimensions of the conical tapered portion would have been greater than the reference lateral dimensions (unstressed dimensions) of the hole at the axial locations which would be axially contiguous thereto when the bolt is so seated.

Figure 5:
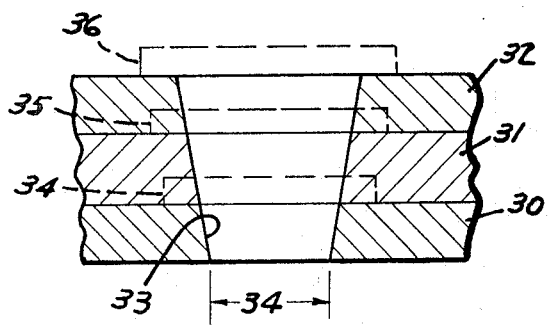
FIG. 5 is a composite illustration of three fasteners according to the prior art.
Figure 6:
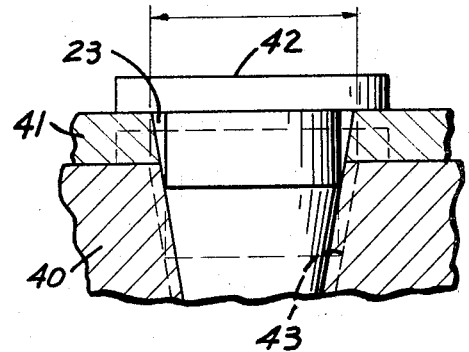
FIG. 6 is a composite illustration of a fastener according to the invention in two holes of different grip lengths.

The advantages relative to head size are schematically illustrated in FIGS. 5 and 6. FIG. 5 illustrates a theoretical pile of plates 30, 31, 32 with a continuous tapered hole 33 extending therethrough. Now assume that a conventional fastener with a taper all the way to the head is to be fastened into each one of these, each of these being assumed to constitute a fastener of nominal size determined by diameter 34 in plate 30. For the thicknesses comprising plate 30, then plates 30, and 31, and then plates 30, 31 and 32 combined, there would generally be provided a series of fasteners with heads 34, 35 and 36, respectively. It will be noted that in every case the edge distance required from the center of the hole has increased because the diameter of the heads has increased. Previously known tapered fasteners have attempted to overcome this by changing the taper angle. This enables the longer fasteners to get by with heads of smaller diameter. In so doing, however, this has required a large number of different taper angles, and a special drill for each of the holes. Should the head size increase, as it does increase by groups of grip lengths, then the head increases both in diameter and in height— a double penalty as to weight.

The advantages of the instant invention are illustrated in FIG. 6 wherein a pair of plates 40, 41 are shown. It is evident that the fastener 42 could readily be pulled into a hole illustrated by dotted line 43 in FIG. 6 should the top plate be removed. The same fastener is also suitable to join the combination of plates 40 and 41 (the solid-line hole). In both cases, the head is the same size. The reason for this increase in grip effectiveness of the same fastener resides in the void region 23 which is formed between the wall of the hole and the relieved portion of the fastener. This completely overcomes the criticality of the relationship between the taper of the hole and the grip length of the fastener within rather broad grip ranges of specified basic grip lengths. It enables a broader use to be made of each fastener. Furthermore, because of this range, it is possible to use a single standard taper angle for many grip ranges which heretofore have required special angles.

This invention is not to be limited by the embodiments shown in the drawings and described in the description which are given by way of example and not of limitation, but only in accordance with the scope of the appended claims.

I claim:

1. A joint comprising a plurality of overlapping plates and a headed bolt, said plates including a continuous conical tapered hole extending therethrough with the bolt being disposed therein and with the bolt being seated against the outermost plate, said hole having a central axis and reference lateral dimensions, said bolt having an axis and including a shank having a conical tapered portion and a second portion lying closer to the axis than would a continuation of the tapered portion, the second portion being adjacent to the head and spacing the conical tapered portion therefrom, the lateral dimensions of the conical tapered portion having been, when out of the hole, greater than the reference lateral dimensions of the hole at the axial locations which will be axially contiguous thereto when the bolt is seated with its head against the outermost plate, whereby in the joint the bolt forms with the plates an interference fit in which the axially aligned lateral dimensions of the hole and of the tapered portion of the bolt are equal, at least a part of said second portion being spaced throughout its periphery from the sidewall of said hole to form a void adjacent to the head and within the hole, a wave of material displaced by the bolt when the interference fit was formed, said wave projecting into the void, and engagement means on the end of the shank opposite from the read.

2. A joint according to claim 1 in which the engagement means is a thread projecting axially beyond the tapered conical portion and a nut threaded thereon.

3. A joint according to claim 1 in which the second portion is a cylinder.

4. A joint according to claim 3 in which the engagement means is a thread projecting axially beyond the tapered conical portion and a nut threaded thereon.

References Cited by the Examiner
UNITED STATES PATENTS

| | | |
|---|---|---|
| 203,658 | 5/1878 | Shipherd. |
| 3,034,611 | 5/1962 | Zenzic _____ 85—1 |
| 3,178,984 | 4/1965 | Barothy _____ 85—9 |

CARL W. TOMLIN, *Primary Examiner.*

R. S. BRITTS, *Assistant Examiner.*